April 16, 1940.   D. W. RANDOLPH ET AL   2,197,115
ELECTRIC THERMOGAUGE ENGINE UNIT (COPPER OXIDE TYPE)
Filed Jan. 27, 1937
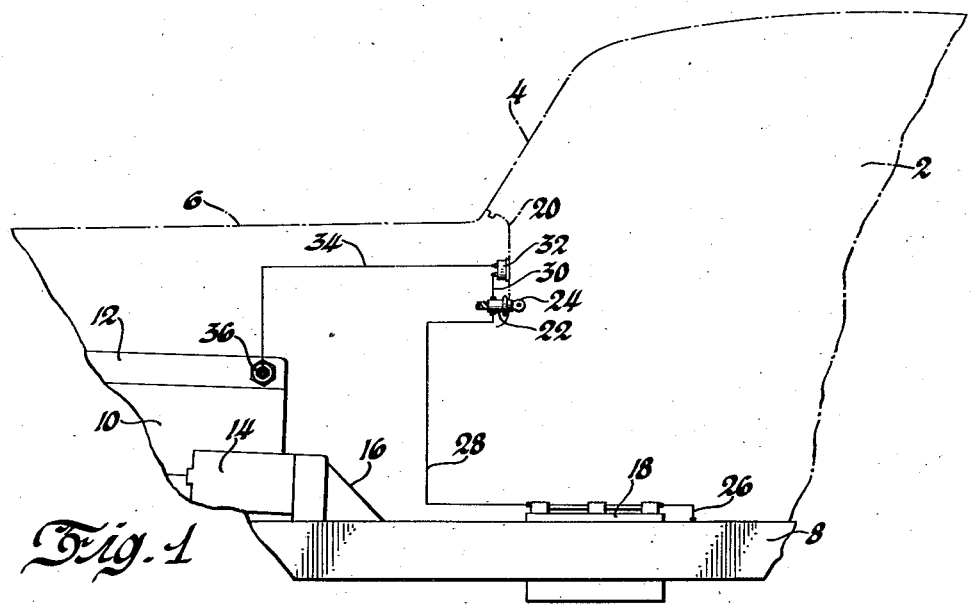
Fig. 1
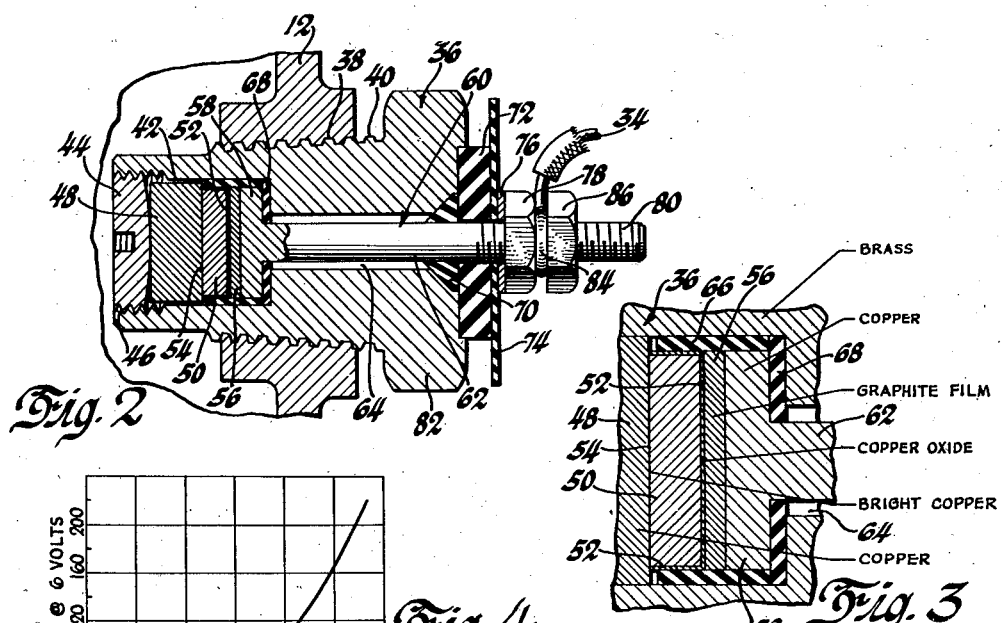
Fig. 2
Fig. 3
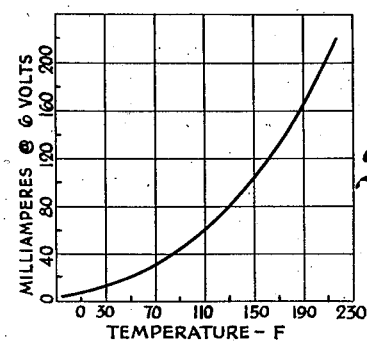
Fig. 4
Inventors
Donald W. Randolph &
Robert H. Bigler
By Blackmore, Spencer & Hint
Attorneys Patented Apr. 16, 1940

2,197,115

UNITED STATES PATENT OFFICE 2,197,115

ELECTRIC THERMOGAUGE ENGINE UNIT (COPPER OXIDE TYPE)

Donald W. Randolph and Robert H. Bigler, Flint, Mich., assignors to General Motors Corporation, Detroit, Mich., a corporation of Delaware Application January 27, 1937, Serial No. 122,657

7 Claims. (Cl. 201—76)

This invention relates to a heat indicator adaptable to a wide range of uses such as to indicate the temperature of the water cooling system of an internal combustion engine; for use on airplanes to indicate the temperature on the airplane wing; to indicate the temperature of steam boilers; and, in general, the invention may be applied to any device or arrangement where it is necessary to obtain accurate indication of the temperature.

In the specific adaptation shown on the drawing the invention is applied to the internal combustion engine of an automotive vehicle. The conventional installation on engines of the type in question has made use of a heat expansive fluid confined in a closed system. The pressure of the fluid was transmitted to a suitable recording instrument at the instrument board of the vehicle. These fluid systems were objectionable because the relative movement between the engine and the instrument board brought out problems of installation to avoid a breaking or cracking of the pipe or capillary tube connecting the bulb in the engine block to the gauge at the instrument panel. In the present system the response of the increase in temperature at the engine is transmitted to the instrument panel by means of a wire which conducts an electric current so that there is eliminated the objectionable characteristic of the probable breaking of the capillary tube between the engine and the instrument board.

The heat responsive unit mounted at the engine comprises a brass plug which is screw threaded into the engine block, so that the inner end of the plug is in direct contact with the water of the cooling system. The plug is hollow at its inner end and has a bore connecting the hollow portion to the exterior of the plug outside of the engine. The plug is sealed water tight at its inner end and has mounted therein a copper oxide button in electrical contact with the plug. A terminal insulated from the plug is in electrical contact with the copper oxide button and is electrically connected outside the engine with a recording instrument at the instrument board of the vehicle. The copper button having the layer of copper oxide has the characteristic of having a high electrical resistance at low temperatures and a relatively low electrical resistance at higher temperatures. Within the range necessary accurately to record the temperatures of the water cooling system of the engine, that is, within a range of from 100 to 212° F. the electrical resistance of the film of copper oxide will have a substantially constant variation in its resistance so that the recording instrument at the instrument panel may be calibrated to read directly in temperatures.

The use of a copper oxidized button or, in general, a piece of copper with an oxide surface thereon in various electrical devices to change a resistance with an increase in temperature is known. It is also known to use a piece of copper with an oxide film thereon as an electrical rectifier. In the experimentation conducted with the temperature indicator of the present invention it was found that the ordinary piece of copper with an oxidized surface would not give the necessary constancy to enable it to be used with a temperature indicator. The ordinary piece of copper with an oxidized surface was found to have a changing resistance with age, when a direct current was passed therethrough for any considerable length of time. This change in the resistance characteristics was material and made it impossible accurately to calibrate a gauge. Where the calibration initially made was satisfactory, due to the change in the resistance of the copper oxide, the calibration was soon inaccurate and the inaccuracy increased the longer the use of the instrument. It was therefore necessary so to treat the copper oxide film on the copper that the resistance of the copper oxide film or the conductivity thereof would have a substantially constant variation over the desired temperature range and maintain this variation during the life of the instrument.

It was also found that in the layer of copper oxide used as an electric rectifier the resistance of such an oxide layer was much lower in one direction than in the other, and as the resistance increases with age it was found impractical to use this type of copper oxide rectifier in a heat sensitive unit.

In forming the piece of copper or button of copper with the oxide coating thereon we first thoroughly cleaned and dried the copper and then heated it in a furnace in an atmosphere of tank nitrogen at a temperature of 950–960° C. for ten minutes. Tank nitrogen contains about 0.2% of oxygen by volume. After the heating in tank nitrogen, air was then admitted to the furnace and the copper is given an additional five minutes exposure to air at the same temperature. The copper is then removed and allowed to cool slowly in air. The film formed on the copper is about 0.004 inch thick and is of a deep red color (cuprous oxide) with a thin surface of black oxide (cupric oxide). There is some indication that there is a small amount of copper nitride mixed with the copper oxide. The film formed in this manner is very smooth, shows no crystalline structure and is not easily separated from the copper base.

Our experiments showed that the copper oxide resistor formed as described is not stable in so far as its resistance or conductivity is concerned. On heating the button and with a direct current passing through the oxide film, the resistance changes, becoming lower with continued exposure to high temperature but the change in resistance did not remain constant. This characteristic made the button or copper oxide piece unsatisfactory for calibration as a temperature indicating unit. It was therefore found necessary to develop some process or method whereby to render the copper oxide film stable and eliminate the resistance due to age and with the passing of an electric current therethrough. It was found that by pre-aging the unit by heating it to a higher temperature than later will be encountered in service, that the desired stability or uniformity of change in electrical resistance could be obtained so that the instrument panel gauge unit could be correctly calibrated. While the pre-aging heating is being done a current of electricity is passed through the unit in the same direction as it will be passed in use. Usually this means the current will be passed through in the direction in which the maximum conductivity is obtained, which is with the oxide face positive. For example, for a unit which is to be used not over the boiling point of water, 212° F., the aging temperature is 280-300° F. with a current of 350 milliamperes passing through the copper oxide piece. The aging is completed in about ten hours. After aging, the unit has a resistance of about 150-200 ohms at 80° F., and a resistance of about 24 ohms at 212° F. Between these two temperatures the change in electrical resistance of the unit varies substantially at a constant rate as is shown by the curve of Figure 4. After this aging treatment it has been found that the electrical resistance variation of the copper oxide button with change in temperature does not change with age or with use but remains substantially constant at all times.

The recording instrument at the instrument panel related with the heat thermostatic unit of the present invention is described and claimed in Patent No. 2,139,385, Bruce H. Schwarze and Robert H. Bigler.

On the drawing

Figure 1 is a view of a part of an automotive vehicle showing the installation of the invention.

Figure 2 is an enlarged sectional detailed view through the thermostatic unit of the invention.

Figure 3 is an enlarged detailed view of the copper oxidized button of the invention and its related parts.

Figure 4 shows the curve indicating the relationship between the temperature and the current applicable to the film of copper oxide on the copper oxidized button.

On the drawing the numeral 2 indicates an automotive vehicle as a whole. The vehicle has the usual windshield 4, hood 6, frame 8, engine 10, engine head 12, starter 14, transmission 16, and battery 18 which is mounted in a suitable way on the chassis 8. The instrument panel or board is indicated at 20, while 22 indicates the usual ignition switch operated by the key 24. The battery 18 is grounded to the frame 8 by the wire 26. A second wire 28 leads from the battery to the ignition switch 22 and a connection 30 leads from the ignition switch to the instrument 32 at the dash. A lead 34 from the dash instrument 32 is connected to the thermostatic unit 36 mounted in the engine head 12 and shown in detail in Figures 2 and 3. Referring to Figure 2, the engine head 12 has a threaded opening 38 to receive the threaded part 40 of the thermostatic unit 36. The unit 36 is grounded to the engine and is screwed into the threaded opening 38 in liquid tight relation.

The inner end of the thermostatic unit 36 is hollow as indicated at 42 and is closed by a plug 44 screw threaded into the threaded end 46 in liquid tight relation. Preferably the plug 44 and the thermostatic unit 36 are made of brass. Adjacent the plug 44 and in contact therewith there is positioned the cylindrical copper element 48 and in contact with the copper element 48 there is the disc-shaped button 50 having thereon a film of copper oxide 52. The copper oxide film is on one side of the button and the periphery only. At the face 54 where the button 50 abuts the element 48 the copper oxide film is removed so that there is a clean surface of copper. Over the copper oxide face of the button 50 there is placed a layer of graphite 56 and over the graphite layer there is positioned the head 58 of a terminal 60. The terminal 60 has the shank 62 which extends through the bore 64 in the thermostatic unit 36.

A cylinder of insulating material 66 surrounds the copper oxide button 50, the graphite layer or film 56 and the head 58 to insulate them from the sides of the brass thermostatic unit 36. A disc 68 of insulating material is placed on top of the head 58 to insulate it from the thermostatic unit 36, the disc 68 being provided with an opening to enable the shank 62 to extend therethrough.

At the outer end of the thermostatic unit 36 the bore 64 is formed into conical shape to receive the conical insulating member 70 which positions the shank 62 and maintains it out of contact with the sides of the thermostatic unit 36. Over the conical insulating member 70 there is positioned the insulating washer 72 and over the washer 72 the insulating plate 74. The insulating members 70, 72, and 74 have mating openings to allow the shank 62 to pass therethrough. A washer 76 fits against the insulating plate 74 and a nut 78 is screwed onto the threaded end 80 of the terminal 60 and tightly pulls the head 58 against the insulating disc 68 and tightly presses the insulating members 70, 72, and 74 against the head 82 of the thermostatic unit 36. Preferably the insulating disc 72 is counterbored in the head 82.

The terminal 84 of the wire 34 is placed over the threaded end 80 into contact with the nut 78, and a second nut 86 is screwed onto the threaded end and tightly holds the terminal 84 in place.

In Figure 4 there is shown the curve indicating the passage of current through the copper oxide button 50 with changes in temperature. For the ordinary internal combustion engine a range of between 110° and 212° is ample. By referring to the curve it will be noted that the resistance to the current passing through the unit at temperatures up to 110° is relatively high so that it would be impractical to calibrate a recording unit for temperatures which are applicable to the cooling system of internal combustion engines. However, between 110° and 212° the curve is substantially straight and deviates so little from a straight line that calibration can be made and give an accurate indication of temperatures. As shown by the curve, at 80° F. substantially 40 milliamperes pass through the copper oxide button at a potential difference of six volts. At 212° F. substantially 200 milliamperes pass through the unit for the same voltage. In other words, the resistance at 80° F. is substantially 187 ohms while at 212° the resistance has decreased to substantially 24 ohms. Between these two temperatures the amount of current flowing increases substantially at a constant rate for rising temperatures; in other words, the resistance varies substantially constantly. By the use of the differential galvanometer 32 mounted at the instrument panel the changes in the temperatures of the water cooling system can be directly read from the instrument panel.

Where it is desired to apply the heat sensitive unit to apparatuses or to places where the range of temperature is different from that shown in the curve of Figure 4, a different type of copper oxide button is used. In conducting our experiments it has been found that if we alloy with the copper, before it is placed through the oxidizing process, a small amount of barium, there is a very material decrease in the electrical resistance, which decrease will enable the unit to be used for temperatures which are much lower than the temperatures of the cooling system of the internal combustion engine. For example, an amount of barium as low as 0.05% very materially decreases the electrical resistance. On the other hand as much as 0.7% of barium would give too low a resistance to allow the copper-barium alloy to be used in the thermogauge unit. It is a question of where the unit is to be used and what the temperature range is, and once having determined the temperature range and the place in which the unit is to be used, the proper amount of barium to be alloyed with the copper can be found.

In forming the film of copper oxide on the button where barium has been alloyed, there is undoubtedly a very small portion of barium oxide in the copper oxide or cuprous oxide film.

We claim:

1. The method of forming a film of oxide on a copper button consisting of cleaning and drying the button, then heating the button in an atmosphere of tank nitrogen to a temperature of 950–960° C. for about ten minutes, then admitting air to the furnace for a period of about five minutes while maintaining the temperature between 750–1000° C., then in removing the button and allowing it to cool slowly in air.

2. The method of forming a film of oxide on a copper button consisting of cleaning and drying the button, then heating the button in an atmosphere of tank nitrogen to a temperature of 950–960° C. for about ten minutes, then admitting air to the furnace for a period of about five minutes while maintaining the temperature between 750–1000° C., then in heating the button for about ten hours in air at a temperature of 250–300° F. and allowing a current to pass through the button during the heating, said current being in excess of the amount of current which will pass through the button in service.

3. The method of aging an oxidized surface on copper in order to give it uniform electrical resistance characteristics, consisting of heating the copper with the oxidized film in atmospheric air to a temperature substantially above that at which the unit will be used in service, and simultaneously passing through the element a current at least as great as the maximum that will be used in service, the current being in the same direction as that used in service.

4. The method of aging an oxidized surface on copper in order to give it uniform electrical resistance characteristics, consisting of heating the copper with the oxidized film in atmospheric air between 280° and 300° F. for a period of about ten hours while passing therethrough an electric current in excess of the amount of current which will pass through the copper oxide surface in service.

5. The method of aging an oxidized surface on copper in order to give it uniform electrical resistance characteristics consisting of heating the copper with the oxidized film in atmospheric air between 280° and 300° F. for a period of about ten hours while passing therethrough an electric current in excess of the amount of current which will pass through the copper oxide surface in service, said current being passed through the copper and the oxide film in the same direction in which the current is to pass when the element is in use.

6. The method of forming a low electrical resistance oxide film on a copper-barium alloy consisting of cleaning and drying the alloy, then heating the alloy in an atmosphere of tank nitrogen to a temperature of 950–960° C. for about ten minutes, then admitting air to the furnace for a period of about five minutes while maintaining the temperature between 750–1000° C., then in removing the alloy and allowing it to cool slowly in air.

7. The method of forming a low electrical resistance oxide film on a copper-barium alloy consisting of cleaning and drying the alloy, then heating the alloy in an atmosphere of tank nitrogen to a temperature of 950–960° C. for about ten minutes, then admitting air to the furnace for a period of about five minutes while maintaining the temperature between 750–1000° C., then in heating the alloy for about ten hours in air at a temperature of 250–300° F. and allowing a current to pass through the alloy during the heating, said current being in excess of the amount of current which will pass through the oxide film in service.

DONALD W. RANDOLPH.
ROBERT H. BIGLER.